Aug. 16, 1932.                J. M. CRAWFORD                1,871,780
STEERING WHEEL LIGHTING SWITCH
Filed Nov. 15, 1930
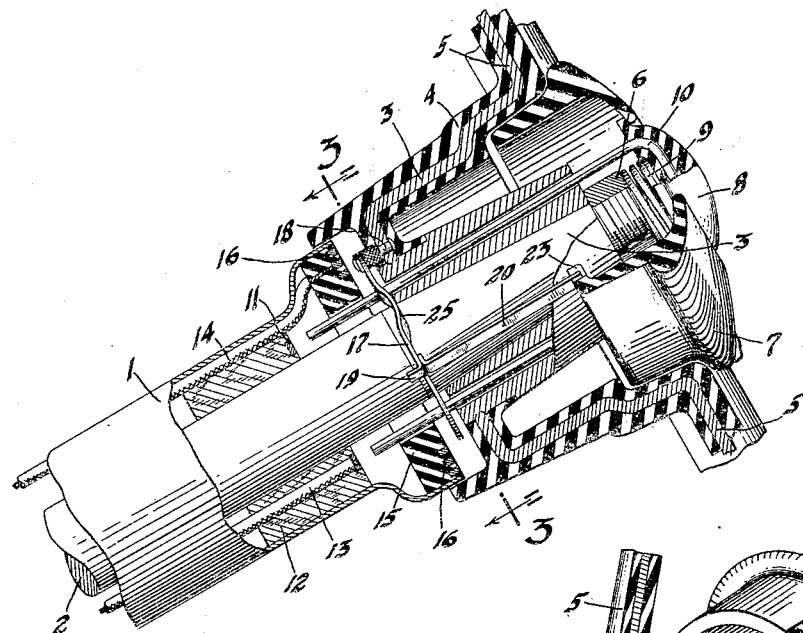
Fig. 1
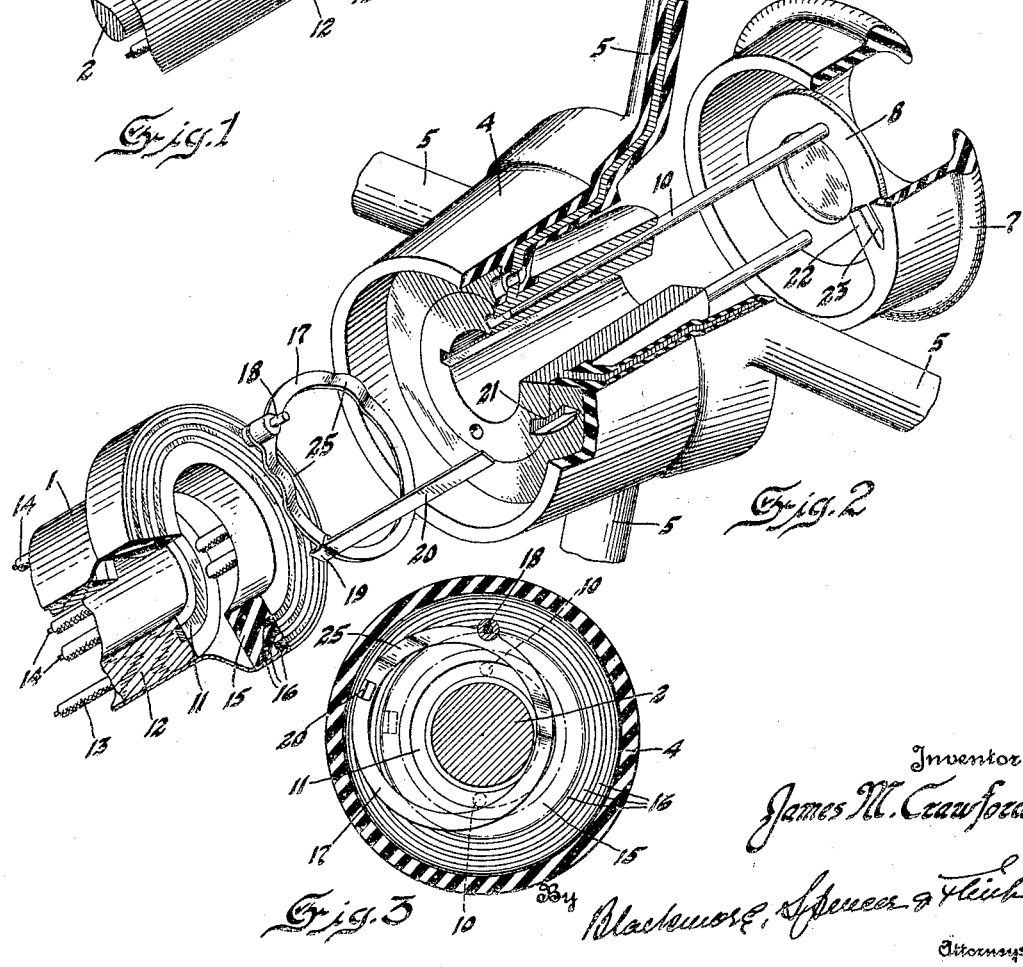
Fig. 2
Fig. 3
Inventor
James M. Crawford
By Blackmore, Spencer & Flich
Attorneys Patented Aug. 16, 1932

1,871,780

UNITED STATES PATENT OFFICE

JAMES M. CRAWFORD, OF DETROIT, MICHIGAN, ASSIGNOR TO GENERAL MOTORS CORPORATION, OF DETROIT, MICHIGAN, A CORPORATION OF DELAWARE

STEERING WHEEL LIGHTING SWITCH

Application filed November 15, 1930. Serial No. 495,887.

This invention relates to steering column assemblies such as are embodied in motor vehicles or the like, and more particularly to control elements incorporated in the steering column.

It is among the objects of the invention to provide control elements of simple design and of low cost construction which can be mounted at the steering wheel hub within easy convenient reach of the vehicle operator and which will be positive in action and unlikely to get out of repair, and furthermore, will promote the ease of assembly and disassembly of parts to facilitate servicing.

Specifically, the invention contemplates an improved multiple switch for controlling electrical circuits such as those in the vehicle lighting system, and involves the mounting and support at the upper end of the stationary tube or housing of a steering column, of an insulator having embedded therein a series of concentric commutator rings, one in each circuit to be controlled, which may be selectively engaged to close a particular circuit by a manually movable contact element pivoted for swinging movement about an axis eccentric to the rings and carried by the steering wheel hub, whereby the contact element may be moved relatively to the hub to a set position with respect to the hub, into selective engagement with any one of the rings and carried with the hub upon rotation in continuous sliding contact with the particular ring selected to maintain the circuit closed in all positions of steering wheel travel.

The invention will be better understood upon reference to the accompanying drawing wherein Figure 1 is a sectional view of the upper end of a steering column and steering wheel hub.

Figure 2 is a detail perspective view showing the several parts separated one from another but in position for final assembly, portions being shown in section.

Figure 3 is a transverse sectional view taken on line 3—3 of Figure 1.

Referring to the drawing, the steering column is shown as including a stationary tube or housing 1 enclosing a rotatable shaft 2 provided at its upper end with a tapered or conical portion 3 on which is fitted and keyed the steering wheel hub 4 having a series of radially extending spokes 5 which may, according to conventional practice, carry a hand wheel, not shown. The hub may be secured in place by means of a nut 6 threaded on the end of the shaft 2 and enclosed within the hollow hub by the rotatable cap or control member 7 adapted for movement independent of the hub for a purpose to be later brought out. This cap member 7 is provided with a central aperture through which projects a button 8 having a marginal or peripheral flange which extends beneath the inner edge of the central opening of the cap 7 to retain the button in place. A helical coil spring 9 is interposed between the button 8 and nut 6 and serves to yieldingly hold the button in seating engagement with the cap 7. Embedded in the button is shown the base or connecting portion of a U-shaped wire or hair pin 10 having its two pins or legs slidably extending through apertures provided in the hub 4 and extending downwardly beyond the hub with its ends in spaced relation with a contact ring 11 which may be carried in an insulator sleeve or bushing 12 between the shaft 2 and tube 1 and connected to a current conducting wire 13 forming a part of a circuit for a horn or other suitable signal. The horn circuit is closed upon depression of the button 8 against spring tension to slide the hair pin 10 into engagement with the ring 11, which grounds the circuit through the steering wheel hub and rotatable shaft.

As shown in the drawing, the upper end of the tube 1 may be enlarged or flared outwardly and extended into a cavity formed on the underside of the hub 4 by a dependent side wall thereof and such enlarged end portion may be utilized to support an insulator ring 15 of bakelite, hard rubber, or the like, which preferably has embedded therein one or more commutator rings 16—16 arranged concentrically to each other and to the axis of the shaft 2, and each having a connection or current conducting wire such as 14 associated therewith. In the drawing three of such rings are disclosed for insertion in a parking light circuit, a dim light circuit and a bright light circuit respectively, the circuits mentioned being those in conventional use on motor vehicles. Within the cavity formed on the underside of the hub is located a contact element 17 which for convenience may consist of an annular element having a central aperture or opening for the extension therethrough of the shaft 2 and the legs of the contact member 10. A pivot pin 18 may be employed to secure the contact 17 to the underside of the hub 4 for swinging movement about the axis of the pin which is offset and eccentric to the axis of the rotatable shaft 2. This contact member is shown as having a dependent ear 19 for sliding engagement with the smooth surface afforded by the flush faces of the insulator ring 15 and commutator rings 16. Secured to the contact element 17 is an operating connection or finger 20 adapted to extend upwardly through an arcuate slot 21 in the hub 4 and into operative engagement with an inturned ear or lateral flange 22 of the cap 7. This flange 22 is shown as being provided with an elongated slot 23 to slidably receive the finger 20 to compensate for the relative movement through different arcs of the flange and finger upon rotation of the cap 7 and contact member 17 controlled thereby, about their respective independent axes.

To operate the switch the operator merely rotates the cap 7 to a given position, which, regardless of the position of the hub 4 relative to the stationary tube 1, acts through the finger 20 to swing the contact member 17 about the pivot 18 to move the contact ear 19 into engagement with the desired commutator ring 16 or else out of engagement with all the commutators. After the selection has been made and the particular circuit grounded through the steering wheel hub, the circuit will remain closed throughout the steering wheel travel and in any position of the steering wheel since the contact member will move with the hub and its path of movement will be concentric to the commutator rings. When all circuits are open the contact merely rides on the insulator inside the commutator rings.

If desired the contact element 17 may be formed of spring material or it may be provided with a spring loop or arcuate formation as shown at 25, whereby to hold the contact ear 19 under tension in tight engagement with the flush face provided by the insulator 15 and commutator rings embedded therein to assure a tight wiping engagement for the passage of electric current between the switch parts.

While the preferred embodiment illustrated has been described more or less specifically, it is to be understood that the invention is not limited to exact details mentioned, and that such modifications may be readily made as come within the scope of the appended claims.

I claim:
1. In a steering column assembly, wherein a stationary housing encloses a rotatable shaft having at one end a steering wheel hub, an insulator carried in the housing below the hub, a series of commutator rings embedded in the insulator in internested concentric relation, a contact element selectively engageable with said rings, means to pivotally connect the contact element with said hub for swinging movemen about an axis offset from and parallel to that of the hub, and a control member associated with and rotatable relative to the hub for swinging said contact element.

2. In a steering column assembly, wherein a stationary housing encloses a rotatable shaft having at one end a steering wheel hub, a commutator ring carried by the housing in concentric relation with the axis of said shaft, a contact element therefor pivotally carried by the hub on an axis eccentric to that of the shaft, a control member rotatably carried by the hub for independent coaxial rotation and an operating connection between said element and member.

3. The structure of claim 2, wherein said operating connection embodies means to compensate for the movement of the member and element about their respective axes.

4. In a steering column assembly, wherein a stationary housing encloses a rotatable shaft having at one end a steering wheel hub, a commutator ring carried by the housing in concentric relation with the axis of said shaft, and a contact device associated with the hub and movable in a direction transverse to the shaft axis into or out of engagement with said ring and about an axis parallel and eccentric to that of the shaft.

5. In a steering column assembly, wherein a stationary housing encloses a rotatable shaft having at one end a steering wheel hub, a series of commutator rings carried by the housing in concentric relation with each other and with the axis of said shaft, and a contact device carried by the hub for movement therewith and pivotally connected thereto on an axis eccentric and parallel to that of the shaft for movement independent of the hub into selective engagement with any one of the series of rings.

6. In a steering column assembly or the like, a support, a series of concentric internested commutator rings carried by the support, a member rotatable relative to the support and substantially about the axis of the rings, and a contact element carried by said member for movement therewith and connected thereto for independent movement into or out of selective contact with any one of said rings.

7. In a steering column assembly or the like, a pair of relatively rotatable members, a commutator carried by one of said members, and a contact element carried by and pivotally connected to the other member on an axis parallel and offset to the axis of relative rotation.

8. In a steering column assembly or the like, a pair of relatively rotatable members, a commutator carried by one of said members, a contact element movable into or out of engagement with said commutator, and means to pivotally connect said element to the other member on an axis eccentric and parallel to the axis of relative rotation.

9. In a switch, the combination with stationary and rotatable members, a commutator ring carried by the stationary member and arranged concentric to the axis of rotation of the rotatable member, and a lever pivotally carried by the rotatable member on an axis eccentric and parallel to the axis of rotation for movement into or out of contact with the commutator ring in all relative positions of the members.

In testimony whereof I affix my signature.

JAMES M. CRAWFORD.